United States Patent [19]
Wolf et al.

[11] 3,740,949
[45] June 26, 1973

[54] FUEL COOLED RAM AIR REACTION PROPULSION ENGINE

[75] Inventors: Robert L. Wolf, Chesterfield County, Va.; Rodney McGann, Northridge, Calif.

[73] Assignee: Texaco Inc., New York, N.Y.

[22] Filed: Nov. 20, 1963

[21] Appl. No.: 324,958

[52] U.S. Cl. .................................... 60/267, 60/270
[51] Int. Cl. ........................................... F02k 11/00
[58] Field of Search ...................... 60/35.3, 35.6 U, 60/35.6 W, 35.6 LL, 35.6 P, 35.6 RJ, 35.6 RT, 267

[56] References Cited
UNITED STATES PATENTS
2,620,625 12/1952 Phaneuf ............................... 60/269
3,040,519 6/1962 Rae ....................................... 60/246

*Primary Examiner*—Samuel Feinberg
*Attorney*—Stowell and Stowell

EXEMPLARY CLAIM

1. A reaction propulsion system including means providing a combustion chamber having at its rearward end an impulse expansion outlet nozzle, means providing a ram air intake, means directing air from the ram air intake to the forward end of the combustion chamber, a fuel storage chamber, indirect fuel heating heat exchange means in heat exchange contact with the ram air in said air directing means, means directing fuel through said heat exchange means, at least a single stage air compressor providing a portion of the air directing means between the heat exchange means and the forward end of the combustion chamber, a direct expansion turbine for driving said compressor, a further fuel heating heat exchange means, said further fuel heating heat exchange means following said at least a single stage of the air compressor and adapted to cool said air compressor compressed air prior to expansion of the compressed air, means for directing fuel through said further heat exchange means, means for directing at least a portion of the air heated fuel through the direct expansion turbine, and means for directing at least the portion of the fuel exhausting from the direct expansion turbine into the combustion chamber.

4 Claims, 2 Drawing Figures

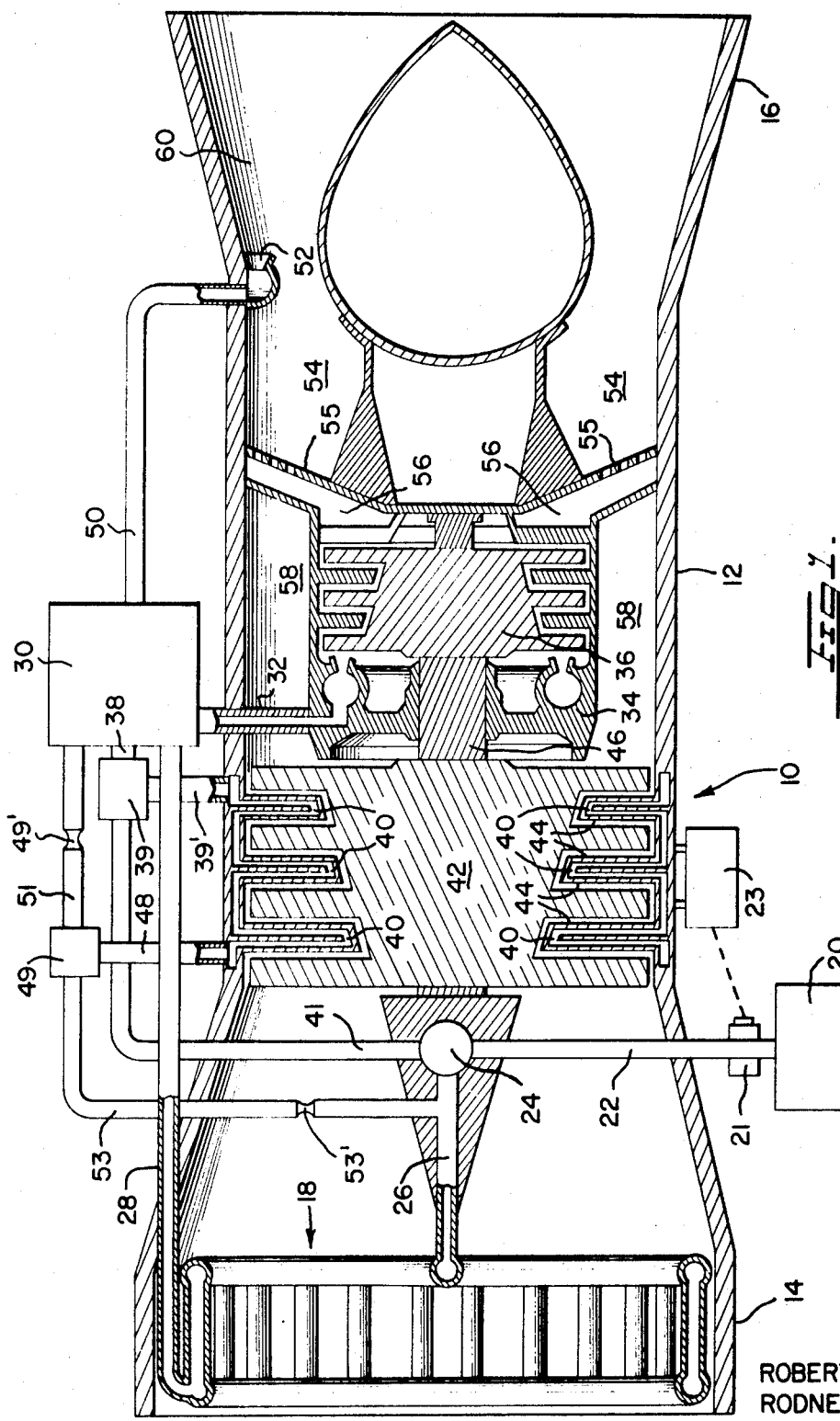

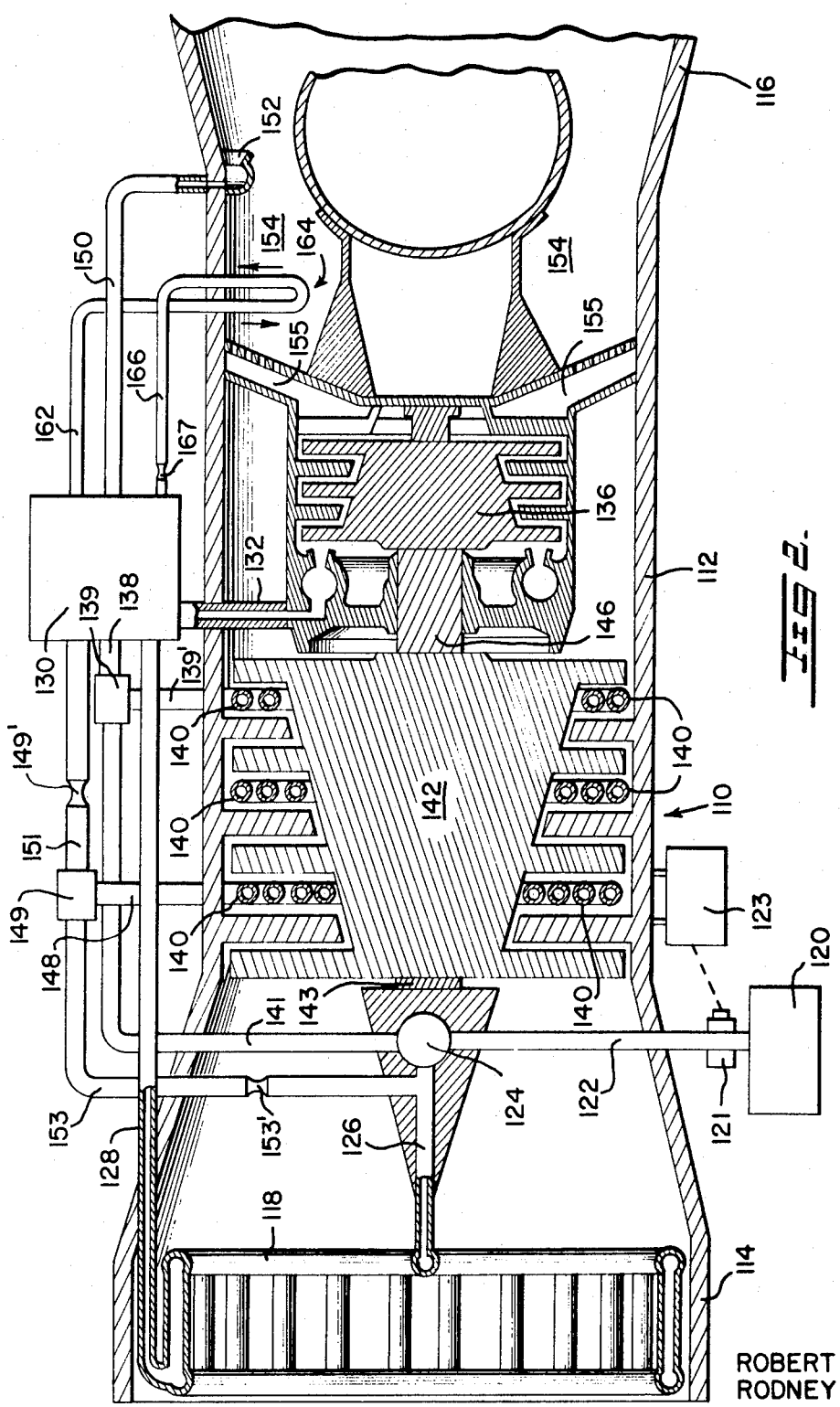

FUEL COOLED RAM AIR REACTION PROPULSION ENGINE

This invention relates to reaction propulsion engines and to methods of operating them and particularly to relatively small and lightweight air breathing reaction propulsion engines capable of accelerating efficiently a load from standstill to hypersonic speeds.

It is a principal object of the present invention to provide an air breathing reaction engine wherein a portion of the energy of the ram air is transferred to the fuel by indirect heat exchange between the ram air and the fuel and wherein further energy may be transferred to the fuel by indirect heat exchange between the fuel and air compressed in a turbine driven air compressor and thereafter the energy thus transferred is at least in part utilized by expanding the fuel or a portion thereof in a turbine driving the air compressor for the engine.

By locating indirect heat exchange means in the air inlet and in the air compressor the heat exchange means cool the ingested diffused air and the compressed air so that the engine downstream of the heat exchangers will not be subjected to temperatures exceeding, for example, that corresponding to about Mach 3 (about 650°F) during Mach 8 flight conditions.

A further object is to provide such a reaction propulsion engine wherein heat from the air is transferred to the fuel following each stage of a plural stage air compressor.

Another object of the present invention is to provide such an engine having a regenerative heat exchanger in a combustion zone of the engine combustion chamber whereby from launching velocities to the low hypersonic range of about Mach 4, the regenerative heat exchanger is employed to provide a portion of the energy required to operate the air compressor.

Another object of the invention is to provide a reaction propulsion engine wherein the turbine driving the air compressor is not aerodynamically coupled to the compressor whereby the power supply to the turbine does not depend on air flow through the compressor eliminating the need for variable geometry compressors or air bleeding while operating over a very wide range of flight conditions.

Another object of the present invention is to provide such an air-turbo engine wherein the air bypasses the turbine and the full compressor discharge pressure is discharged into the combustion zone of the engine.

For high cooling efficiency, it is desirable that the fuel selected have a high heat capacity within the operating temperature range to provide for a high absorption of energy per pound of fuel. For efficient conversion of energy to thrust in the expansion process, the fuel should be one which provides a low average molecular weight in the exhaust gases. Within these limitations a considerable range of fuels is available from which selection may be made in the light of other properties of the fuels and the effect on the particular demands to be made on the engine. Among the fuels of interest are hydrogen and hydrogen-bearing compounds such as ammonia, methyl alcohol, ethyl alcohol, methane, ethylene glycol and cyclohexane.

Of these fuels, fuels which undergo endothermic decomposition or dissociation at temperatures between their storage temperature and the turbine and/or combustor entrance temperature are particularly suited for use in the engine. The most suitable fuels will dissociate at these temperatures to hydrogen and other relatively low molecular weight compounds without the formation of free carbon particles. Preferred examples of such fuels are ammonia, methyl alcohol, ethylene glycol and cyclohexane.

The preferred high heat capacity fuels, ammonia, methyl alcohol, ethylene glycol and cyclohexane, dissociate into hydrogen and nitrogen, hydrogen and carbon monoxide, hydrogen and carbon monoxide, and hydrogen and benzene, respectively. The dissociation is endothermic and the resulting gaseous products are of low molecular weight and are exceptionally clean; that is, they and their combustion products have little or no tendency to foul the engine as they contain no free carbon.

In general, the invention comprises a reaction propulsion system including means providing a combustion chamber having at its rearward end an impulse expansion outlet nozzle, means providing a ram air intake, means directing air from the ram air intake to the forward end of the combustion chamber, a fuel storage chamber, indirect fuel heating heat exchange means in heat exchange contact with the ram air in the air directing means, means for directing fuel through the indirect heat exchange means, an air compressor providing a portion of the air directing means between the indirect heat exchange means and the forward end of the combustion chamber, a direct expansion turbine for driving the air compressor, further fuel heating heat exchange means associated with the air compressor, means for directing fuel through the further indirect heat exchange means, means for directing at least a portion of the air heated fuel through the direct expansion turbine and means for directing at least the fuel exhausting from the direct expansion turbine into the combustion chamber.

The invention will be more particularly described with reference to the illustrative embodiments thereof shown in the accompanying drawings wherein:

FIG. 1 is a schematic sectional view of the reaction propulsion engine embodying the principles of the present invention; and FIG. 2 is a schematic sectional view of a reaction propulsion engine similar to that illustrated in FIG. 1 illustrating a modified form of the present invention.

Referring to FIG. 1 of the drawings, 10 generally designates a reaction propulsion engine embodying the principles of the present invention. The engine includes a shell or housing 12 having a forward end 14 and a rearward end 16. The forward end 14 of the shell or housing 12 connects to the inlet duct for ram air, the path of the ram air being indicated by the directional arrows A.

In the forward end 14 of the ram air passage is an indirect heat exchange means 18 having its outer surface in contact with the ram air entering the engine. The internal surfaces of the indirect heat exchange means provide a path for the flow of fuel. Fuel from the fuel tank 20 is directed via conduit 22 through turbine driven pump 24 and conduit 26 to the indirect heat exchange means 18.

The rate of flow of fuel to the ram air heat exchanger 18 may be controlled within wide limits by varying the output from the fuel pump 24 or by providing a control valve 21 in the fuel line. The pump output volume or the control valve 21 may be manually controlled and/or as indicated in the drawing the control thereof may be provided by the compressor outlet temperature sensing means 23 which would insure that sufficient fuel is passed to the heat exchanger 18 to maintain limits on the turbine inlet temperature and the compressor discharge temperature.

From the indirect heat exchange means 18 a conduit 28 directs the fuel to a fuel flow control valve 30. From the control valve 30, the fuel or a portion thereof may be directed to conduit 32 connecting the control valve with a direct expansion turbine nozzle ring 34 which directs the fuel to the turbine blades of the direct expansion turbine 36.

At least a portion of the fuel directed to the fuel flow control valve 30 may also be selectively directed via conduit 38, control valve 39 and conduit 39' to a further fuel heating heat exchange means 40 associated with a plural stage air compressor generally designated 42. The further heat exchange means 40 is provided in the stator sections 44 of each stage of the air compressor 42 which air compressor is connected by shaft means 46 to the direct expansion turbine 36.

Fuel, directly from the fuel pump 24, may also be directed into the heat exchange means 40 via conduit 41 which connects the output side of pump 24 with the control valve 39. The control valve 39 determines the proportion of fuel from the pump 24 and the proportion of the ram air heated fuel which are to be passed via conduit 39' into the compressor heat exchange means 40.

Fuel, after passing through the heat exchange means associated with the plural stage air compressor 42, flows via conduit 48, control valve 49, conduit 51 and flow restrictor 49' to the fuel flow control valve 30, where it is mixed with the portion of the fuel flowing from the valve means through conduit 32 to the annular nozzle ring 34 of the direct expansion turbine 36.

Fuel issuing from the air compressor heat exchange means 40 may also be directed via control valve 49, conduit 53 and flow restrictor 53' into conduit 26 for passage through the ram air heat exchanger 18.

Also a portion of the fuel flowing from the indirect heat exchange means 18 and/or 40 to the flow control valve means 30 may be directed via conduit 50 to the fuel outlet thrust nozzle 52 positioned in the combustion chamber 54. The thrust nozzle 52 may be advantageously positioned externally of combustion chamber 54 particularly when the amount of fuel needed to cool the ram air is greater than the amount of fuel which could be burned stoichiometrically with the available air supply.

The fuel issuing from the direct expansion turbine 36 is directed into the inner ends of each of the fuel distributing conduit means 55 at the forward end of the combustion chamber 54 via annular passage 56. The compressed air issuing from the air compressor 42 flows through annular chamber 58 into the combustion chamber 54 where it mixes and combusts with the fuel. The products of combustion of the fuel and the compressed air issue from the rearward nozzle 60 of the reaction propulsion engine.

As hereinbefore discussed, for high cooling efficiency and to provide a high rate of absorption of energy per pound of fuel, it is desirable that the fuel selected have a high heat capacity within the expected operating temperature range of the engine. At the same time for efficient conversion of energy into thrust in the expansion process, the fuel should be one which provides low average molecular weight components in the exhaust gases. Thus, cryogenic hydrogen or fuels which undergo endothermic decomposition at temperatures between their storage temperature and the turbine and/or combustor entrance temperatures are particularly suited for use in the system of the invention.

When such fuels are used at relatively low flight speeds below about Mach 1.5 in a system where the incoming air and the mechanically compressed air are used to heat the fuel prior to combustion, substantially all of the fuel heated in the air inlet indirect heat exchange means 18 and the fuel heated in the air compressor indirect heat exchange means 40 will be required to be passed through the turbine 36 to operate the air compressor. As the flight speed and the temperature of the inlet air increase, more cooling of the air ahead of the combustion chamber will be required and hence there will be more heating of the fuel prior to its passage to the turbine and/or combustion zone. Thus, less fuel will be required to operate the turbine 36 and a greater portion of the fuel will be directed by the flow control means 30 directly into the combustion chamber 54 via conduit 50 and thrust nozzle 52.

The air to fuel indirect heat exchangers located ahead of the compressor and within the air compressor serve three main purposes. The first is to increase the available turbine work of the fuel by heat addition without combustion while lowering the work required to compress the air thereby making the cycle more efficient. The second is to cool the incoming air to acceptable temperature levels, preferably below 1000°F, to avoid excessive exit temperatures and dissociation of the products of combustion in the combustion zone. The third is to increase the density of the air through cooling to give a higher mass flow per unit of compressor frontal area and a resultant higher level of thrust.

Where the power requirements of the turbine 36 are particularly high and at low altitudes and low Mach number speeds, the heat transferred to the fuel from the indirect heat exchange means in the ram air inlet and the heat transferred to the fuel from the indirect heat exchange means associated with the compressor 42 may be insufficient to effectively operate the turbine and under these conditions the use of a regenerative heat exchanger in the combustion chamber may be employed to provide the additional energy requirements of the turbine 36. A system embodying such further regenerative heat exchange means is illustrated in FIG. 2 of the drawings.

Referring to FIG. 2 of the drawings, the engine 110 includes a shell or casing 112 having a forward end 114 and a rearward end 116. The forward end 114 of the shell connects to the inlet duct for ram air; the path of the ram air being indicated by the directional arrows A.

In the forward end 114 of the ram air passage is an indirect heat exchange means 118 having its outer surface in contact with the ram air entering the engine. Fuel from the tank 120 is directed via conduit 122 through turbine driven pump 124 and conduit 126 to the interior of the indirect heat exchange means 118.

The rate of flow of fuel to the ram air heat exchanger 118 may be controlled within wide limits by varying the output from the fuel pump 124 or by providing a control valve 121 in the fuel line. The pump output volume or the control valve 121 may be manually controlled and/or as indicated in the drawing the control thereof may be provided by the compressor outlet temperature sensing means 123 which would insure that sufficient fuel is passed to the heat exchanger 118 to maintain limits on the turbine inlet temperature and the compressor discharge temperature.

From the indirect heat exchange means 118 a conduit 128 directs the fuel to a fuel flow control valve 130. From the fuel flow control valve 130, the fuel or a portion thereof may be directed to conduit 132 connecting the control valve with a direct expansion turbine nozzle ring 134 which directs the fuel to the turbine blades of the direct expansion turbine 136.

A portion of the fuel directed to the fuel flow control valve 130 may also be selectively directed via conduit 162 to a regenerative heat exchange means 164 positioned in combustion chamber 154 of the reaction propulsion engine. The return line 166 directs heated fuel from the regenerative heat exchange means 164 through flow restrictor 167, then to the flow control valve 130 where it is mixed with a portion of the fuel flowing from the valve means through conduit 132 to the annular nozzle ring 134 of the turbine 136. Also a portion of the fuel flowing from the indirect heat exchange means 118 to the flow control valve means 130 may be directed via conduit 138, control valve 139 and conduit 139' to the heat exchange means 140 associated with the air compressor 142.

Fuel, directly from the fuel pump 124, may also be directed into the heat exchange means 140 via conduit 141 which connects the output side of pump 124 with the control valve 139. The control valve 139 determines the proportion of fuel from the pump 124 and the proportion of the ram air heated fuel which are to be passed via conduit 139' into the compressor heat exchange means 140.

The return line from the indirect heat exchange means 140 directs the heated fuel to the flow control valve 135 via conduit 148, control valve 149, conduit 151 and flow restrictor 149' wherein the output is directed via conduit 150 to fuel outlet thrust nozzle 152 located in the rearward end of the combustion chamber 154 or to conduit 132 connecting the flow control valve 130 with the turbine 136.

Fuel issuing from the air compressor heat exchange means 140 may also be directed via control valve 149, conduit 153 and flow restrictor 153' into conduit 126 for passage through the ram air heat exchanger 118.

It will also be recognized that the portion of the fuel directed to the regenerative heat exchanger 164, positioned in the combustion chamber, may be fuel that has passed serially through the ram air heat exchanger and the air compressor heat exchanger.

The heat exchange means 140 associated with the air compressor 142 differs from the heat exchange means 40 associated with the air compressor 42 of the form of the invention shown in FIG. 1 in that the heat exchange elements in this form of the invention are positioned after each of the plural stages of the air compressor rather than forming an integral part of the stator members of the compressor.

The direct expansion turbine 136, as in the form of the invention illustrated in FIG. 1, is connected through shaft 146 to the rotor of the air compressor 142 and a shaft 143 extending from the forward end of the rotor of the air compressor 142 drives the fuel pump 124.

Fuel issuing from the turbine 136 is directed into the combustion chamber 154 through the fuel outlet conduits 155, thus the fuel passing through the turbine 136 is conveniently directed into the combustion chamber.

An engine of the type illustrated in FIG. 2 can be operated efficiently through the velocity range from static launch to Mach 10 and altitudes up to 150,000 feet using the endothermically dissociating fuels of the invention or cryogenic hydrogen. Below Mach 4 where insufficient heat may be transferred from the incoming ram air to the fuel in the heat exchanger 118 and heat exchanger 140 to effectively operate the turbine which, in turn, drives the air compressor 142 and the fuel pump 124, the flow control valve means 130 directs a portion of the fuel passing to the valve from the heat exchangers 118 and/or 140 to conduit 162 for passage through the regenerative heat exchanger 164. As less fuel is needed to drive the turbine 136, as the temperature of the fuel passing to the turbine increases, the flow control valve means 130 directs excess fuel via conduit 150 directly into the combustion chamber via thrust nozzle 152.

The controllers for fuel flow control valve means 30, 39, 49 and 130, 139 and 149 may be fuel, turbine or compressor temperature responsive, altitude responsive, vehicle speed responsive, turbine speed responsive or a combination of two or more of these factors, or the valves may be connected to mechanical or electronic programming means which may be of the ground control or of the pre-set type as is known in the art. About Mach 4 none of the fuel passing from the heat exchangers 118 and/or 140 is passed to the regenerative heat exchanger 164 and the air heating of the fuel provides all of the energy requirements of the turbine.

From the foregoing discussion of the systems shown in FIGS. 1 and 2, it will be seen that fuel from the fuel storage tank may be passed to the forward ram air heat exchanger, or to the compressor heat exchanger or to both heat exchangers serially or in parallel and when serial flow through both heat exchangers is desired the fuel may flow first to the compressor heat exchanger or first to the ram air heat exchanger.

A portion of the heated fuel after passing through one or both of the air-fuel exchangers is passed to the compressor turbine and the remainder of the air heat fuel may be passed to the thrust nozzles 52 or 152.

Further, where a regenerative heat exchanger is used, all or a portion of the air heated fuel, to be directed to the compressor turbine, may be passed through the regenerative heat exchanger.

Various modifications may be made in flow paths of the fuel from the fuel tank to the combustion chamber and/or the thrust nozzles without departing from the scope of the present invention. For example, in FIGS. 1 and 2, fuel flow through heat exchangers 40 and 140 is illustrated as being from the last stage to the first stage; however, this direction of flow may be reversed so that the flow is first to the first stage of the compressor heat exchanger.

Where desired, the cold fuel exhausting from the turbine may be utilized to cool engine parts such as the combustor case, exhaust nozzle, etc. prior to combustion of the fuel with the compressed air in the combustor.

We claim:

1. A reaction propulsion system including means providing a combustion chamber having at its rearward end an impulse expansion outlet nozzle, means providing a ram air intake, means directing air from the ram air intake to the forward end of the combustion chamber, a fuel storage chamber, indirect fuel heating heat exchange means in heat exchange contact with the ram air in said air directing means, means directing fuel through said heat exchange means, at least a single stage air compressor providing a portion of the air directing means between the heat exchange means and the forward end of the combustion chamber, a direct expansion turbine for driving said compressor, a further fuel heating heat exchange means, said further fuel heating heat exchange means following said at least a single stage of the air compressor and adapted to cool said air compressor compressed air prior to expansion of the compressed air, means for directing fuel through said further heat exchange means, means for directing at least a portion of the air heated fuel through the direct expansion turbine, and means for directing at least the portion of the fuel exhausting from the direct expansion turbine into the combustion chamber.

2. A reaction propulsion system including means providing a combustion chamber having at its rearward end an impulse expansion outlet nozzle, means providing a ram air intake, means directing air from the ram air intake to the forward end of the combustion chamber, a fuel storage chamber, indirect fuel heating heat exchange means in heat exchange contact with the ram air in said air directing means, means directing fuel through said indirect fuel heating heat exchange means, a plural stage air compressor providing a portion of the air directing means between the heat exchange means and the forward end of the combustion chamber, a direct expansion turbine for driving said plural stage air compressor, further fuel heating heat exchange means following at least one of the stages of the plural stages of the further fuel heating heat exchange means, means for directing fuel through said further fuel heating heat exchange means, means for directing at least a portion of the air heated fuel through the direct expansion turbine and means for directing at least the portion of the fuel exhausting from the direct expansion turbine into the combustion chamber.

3. The invention defined in claim 2 wherein said further fuel heating heat exchange means follows each of the stages of the plural stage heat exchanger means.

4. A reaction propulsion system including means providing a combustion chamber having at its rearward end an impulse expansion outlet nozzle, means providing a ram air intake, means directing air from the ram air intake to the forward end of the combustion chamber, a fuel storage chamber, indirect fuel heating heat exchange means in heat exchange contact with the ram air in said air directing means, means directing fuel through said heat exchange means, at least a single stage air compressor providing a portion of the air directing means between the heat exchange means and the forward end of the combustion chamber, a direct expansion turbine for driving said compressor, a regenerative fuel heating heat exchanger positioned in the combustion chamber, a further fuel heating heat exchange means, said further fuel heating heat exchange means following said at least a single stage of the air compressor, said further heat exchange means adapted to cool said air compressor compressed air prior to expansion of the compressed air, means for directing fuel through said further fuel heating heat exchange means, means for selectively directing at least a portion of the air heated fuel to said regenerative heat exchanger, means directing at least a portion of the air heated fuel and the fuel passing through the regenerative heat exchanger through the direct expansion turbine, and means for combusting at least the portion of the fuel exhausting from the direct expansion turbine in the combustion chamber.

* * * * *